May 8, 1923.
A. A. BACKHAUS
PROCESS OF PRODUCING HIGH GRADE ESTERS
Filed Sept. 20, 1919  2 Sheets-Sheet 1
1,454,462
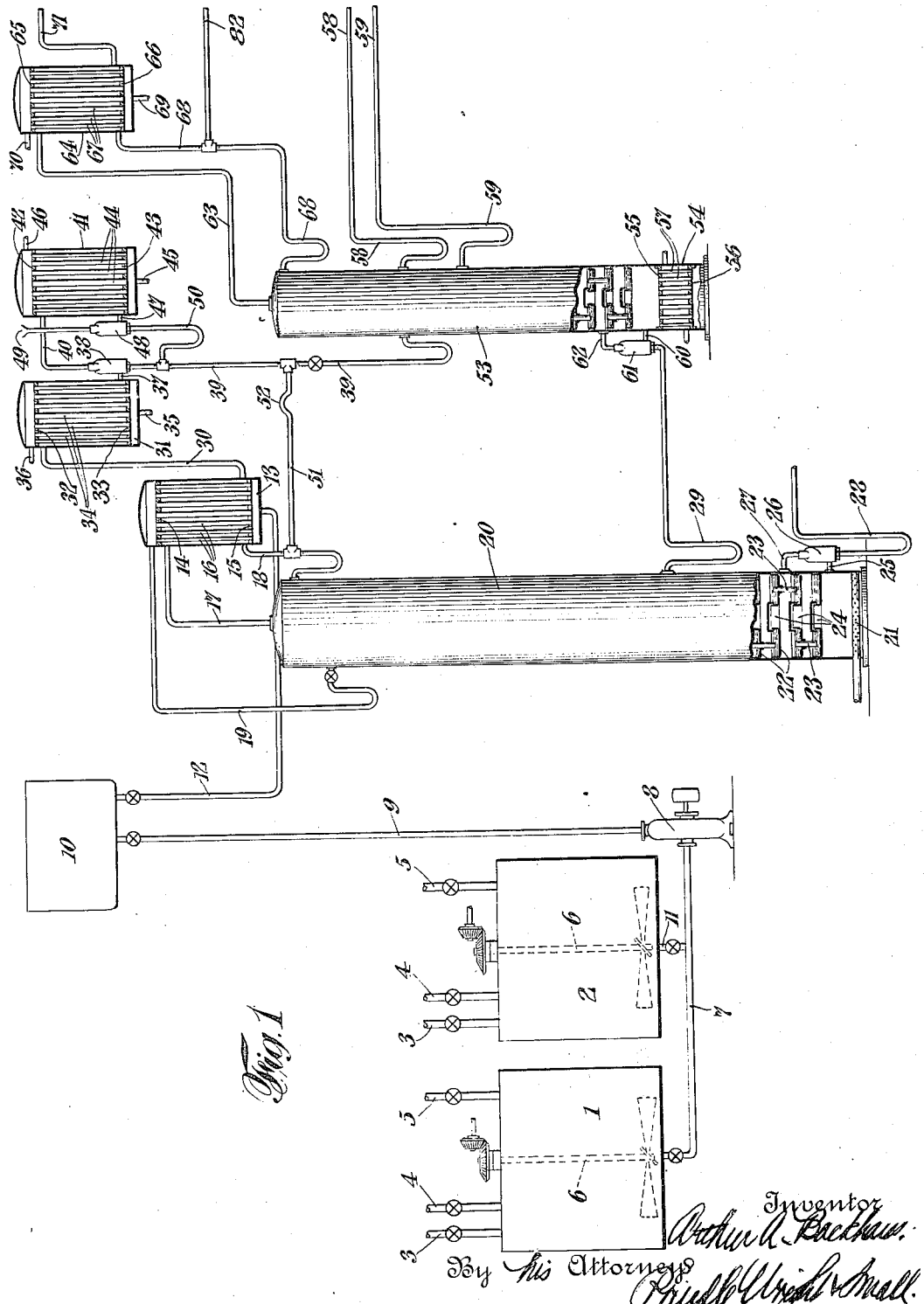

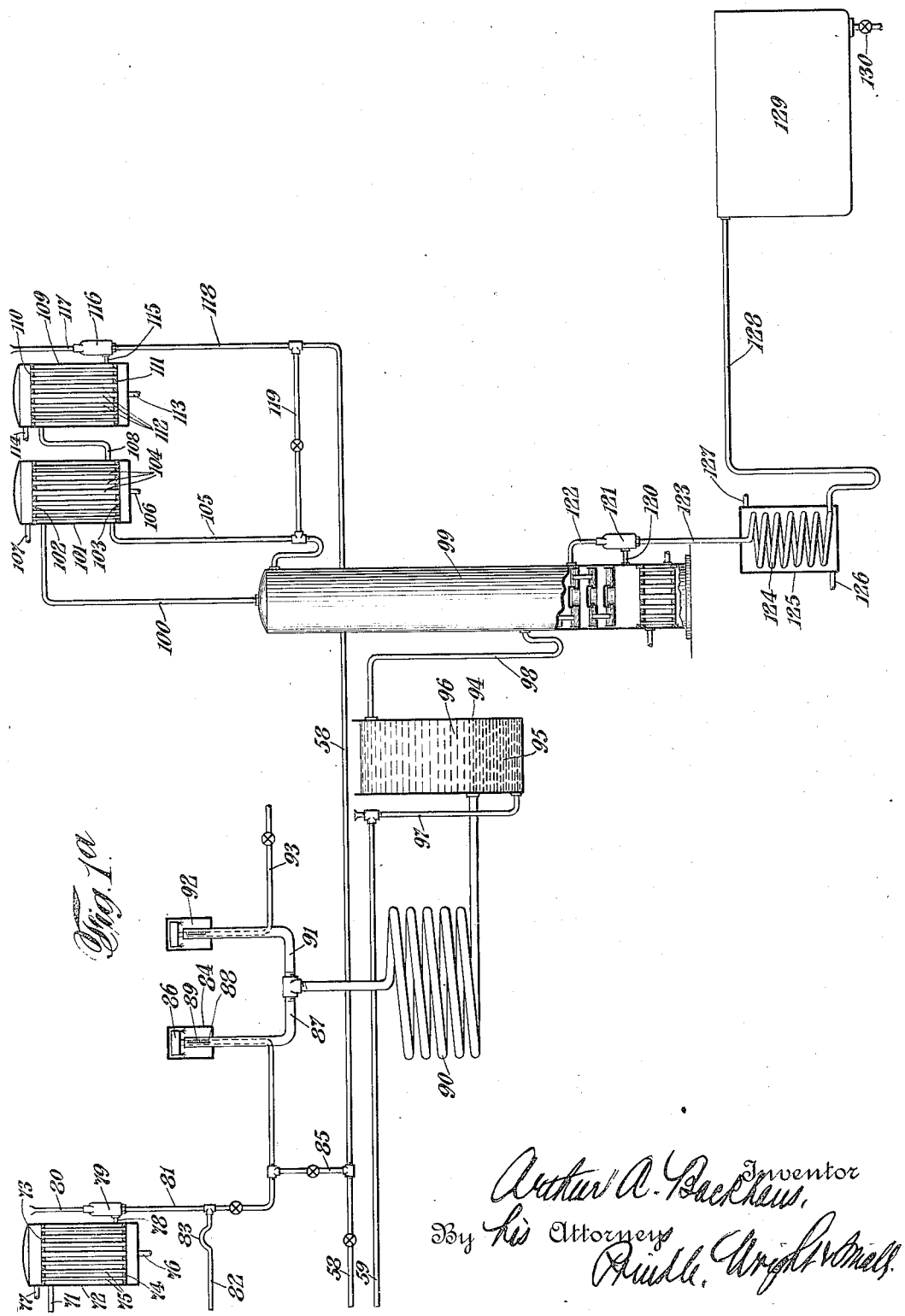

Patented May 8, 1923.

1,454,462

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

PROCESS OF PRODUCING HIGH-GRADE ESTERS.

Application filed September 20, 1919. Serial No. 325,106.

*To all whom it may concern:*

Be it known that I, ARTHUR A. BACKHAUS, a citizen of the United States, residing at Baltimore, in the State of Maryland, have invented a certain new and useful Improvement in Processes of Producing High-Grade Esters, of which the following is a specification.

My invention relates particularly to a process of producing esters having a high purity, and especially ethyl acetate which is substantially free from water.

The object of my invention is to provide esters which have a high degree of purity, and especially ethyl acetate of substantially 100% strength in an advantageous manner. Another object of my invention is to provide a process of this character which is capable of continuous operation. Again another object of my invention is to produce esters of this character by rectifying a mixture of the particular ester with other substances, such for example as water and an alcohol, containing a larger percentage of the ester than would be present in a constant boiling mixture of these substances, so as to obtain an ester having substantially 100% strength. Still another object of my invention is to form an ester by bringing together an alcohol, an acid, and a catalyst, distilling off the ester with water and the alcohol mixed therewith, condensing the ester admixed with these other substances, and separating the ester from the latter by rectification. Again another object of my invention is to bring a body of water into contact with a constant boiling mixture containing an ester, an alcohol, and water, in which the ester is present in a larger percentage than would be present in a constant boiling mixture of these materials, thereby causing the materials to separate into a layer having a percentage of the ester greater than in the constant boiling mixture, and another layer containing a smaller percentage of the ester than in the constant boiling mixture. Furthermore, still another object of my invention is to rectify this layer containing the higher percentage of ester, so as to obtain as a residue an ester having a strength of substantially 100%. A further object is to produce esters from alcohols and organic acids in the presence of a catalyst by the introduction of live steam.

Further objects of my invention will appear from the detailed description thereof contained hereinafter.

While my invention is capable of embodiment in many different forms, for the purpose of illustration I shall describe only certain forms of the same hereinafter, and while it is capable of being carried out in connection with many different types of apparatus, I have shown only one type of apparatus for use in connection therewith in the accompanying drawing, in which;

The figure (Sheet 2 presenting a continuation at the right of Sheet 1) is a diagrammatic representation of an apparatus which may be used in connection with my invention.

While my invention is capable of being carried out in connection with the manufacture of different esters, and with the use of different starting materials, I shall by way of example describe the invention as applied to the manufacture of ethyl acetate from alcohol and vinegar with the aid of sulphuric acid as a catalytic.

In the drawing, I have shown two mixing tanks 1 and 2 which are designed to be used alternately, the construction of which is exactly the same in the two tanks. The tank 1 is provided with three inlet pipes 3, 4 and 5 containing sulphuric acid, alcohol, and vinegar respectively. These three materials are preferably fed into the tank 1 in about the proportion of .33 parts by weight of sulphuric acid having a strength of 50° to 66° Bé., to 10 parts by weight of vinegar having a strength of 8% acetic acid, and 8/10 part by weight of ethyl alcohol having a strength of 95%. These materials are mixed in the tank 1 by means of an agitator 6 driven from any suitable source of power. The mixed materials are fed out of the tank 1 into a valved pipe 7 from which they are discharged by a pump 8 through a pipe 9 into a supply tank 10. The mixing tank 2 is also connected to the pipe 7 by means of a valved branch pipe 11, and it will be understood that in the operation of the apparatus the two mixing tanks 1 and 2 will be operated alternately. In the present embodiment the pump 8 supplies these mixed materials to the supply tank 10 continuously, and therefrom they flow continuously by means of a valved pipe 12 through a combined dephlegmator and preheater 13, provided with tube sheets 14 and 15 and interposed tubes 16, through which these mixed materials are passed in order to be heated by heated vapors admitted between the tube sheets 14 and 15 by an inlet pipe 17, a condensate being discharged by a pipe 18. From the preheater 13 the preheated materials are led through a trapped valved pipe 19 to the side of an esterification column 20 maintained at a temperature of approximately 80° C., at the top thereof. Heating steam passes into the column 20 through a perforated pipe 21 located in the bottom thereof, and is thus caused to pass through a descending current of the liquid passing over a plurality of pans 22 having intervening overflow pipes 23. The vapors are conducted from each pan to the succeeding pan through hooded vapor pipes 24. From the bottom of the column 20, the slop containing sulphuric acid is preferably continuously discharged by a pipe 25 leading to an overflow bottle 26 having a vapor outlet pipe 27 leading back to the column 20 and a liquid discharge pipe 28 passing out from the bottom of the bottle 26. In the side of the column 20, there is also shown a further trapped inlet pipe 29 for feeding into the same alcohol having a strength of 70–90%, which is preferably supplied from a portion of the apparatus to be hereinafter described.

Through the action of the catalyst, ethyl acetate is formed in the column, and continually passes out of the top of the same admixed with alcohol and steam by means of the pipe 17 which is shown connected to the dephlegmator and preheater 13. The lower portion of the vapor space in the dephlegmator and preheater is connected by the pipe 18 to the upper portion of the column 20, so as to convey back into the same the first distillate in order to keep the pans sealed in the column. From this point the vapors pass from the dephlegmator and preheater by a pipe 30 to a warm condenser 31 having two tube sheets 32 and 33 connected with a series of tubes 34, and the temperature of which is maintained at 60–70° C., by a current of water passing into the same through inlet and outlet pipes 35 and 36. From this point the condensed liquid which comprises approximately 10% by weight of ethyl acetate, 70% by weight of alcohol, and 20% by weight of water passes out of the condenser by means of a pipe 37 to a bottle 38 having a valved trapped liquid outlet pipe 39 and a vapor outlet pipe 40 which latter leads to a cold condenser 41 having tube sheets 42 and 43 provided with a series of interposed tubes 44 cooled by a current of water supplied through inlet and outlet pipes 45 and 46. The condensate from the condenser 41 passes by a pipe 47 into a bottle 48 having a vapor vent pipe 49 and a trapped liquid outlet pipe 50 which leads to the liquid outlet pipe 39. From the pipe 39 a pipe 51 conveys any excess of the liquid not fed forwardly in the apparatus back to the pipe 18, so as to allow the same to be discharged in the column 20. This pipe 51 has an upwardly bent portion 52, so that only such excess will pass through the pipe 51. The pipe 39 conveys the mixed ethyl acetate, alcohol, and water, into a separating column 53, the interior of which is constructed the same as in the case of the column 20, except that in this instance there is a steam heater 54 comprised of tube sheets 55 and 56 carrying a plurality of tubes 57. The upper portion of this column is maintained at a temperature of substantially 70° C. In the side of the column 53, there are additional trapped liquid inlet pipes 58 and 59 leading from parts of the apparatus to be hereinafter described, and at the bottom of the column 53 there is an outlet pipe 60 leading to an overflow bottle 61 connected by a vapor outlet pipe 62 to the column 53, and connected at its lower end to the pipe 29. The vapors which pass out of the top of the column 53 are comprised of a mixture of ethyl acetate, alcohol, and water, the principal constituent of which is ethyl acetate. These vapors are conveyed by a pipe 63 to a dephlegmator 64 having tube sheets 65 and 66 carrying tubes 67 and provided with a trapped liquid return pipe 68 leading back to the top of the column 53 in order to keep the pans therein sealed with liquid. The dephlegmator 64 is cooled by a current of cooling water supplied with the aid of inlet and outlet pipes 69 and 70. From this dephlegmator 64 the uncondensed vapors pass by a pipe 71 to a condenser 72 having tube sheets 73 and 74 carrying tubes 75 and cooled by a current of water supplied with the aid of inlet and outlet pipes 76 and 77. The condensate which comprises a constant boiling mixture of ethyl acetate, alcohol, and water, contains approximately 83% of ethyl acetate, 9% of ethyl alcohol, and 8% of water, and is conveyed out of the condenser 72 by means of a pipe 78 to an overflow bottle 79 having a vent 80 and a valved liquid outlet pipe 81. From this outlet pipe 81 a pipe 82 is provided for conveying any excess of the liquid back to the pipe 68 and thence to the column 53, said pipe 82 being provided with an upwardly bent portion 83 to permit only such excess to be fed in this direction. The pipe 81 conveys this constant boiling mixture to a measuring receptacle 84, but is connected in advance of said measuring receptacle 84 by means of a valved pipe 85 to the pipe 58, so that the liquid in the pipe 58 may, if desired, be also fed to the measuring receptacle 84 instead of being lead by the pipe 58 into the column 53. When the liquid in the pipe 58 contains at least 80% ester, it will be fed through the pipe 85 into the pipe 81, but if the percentage of the ester is lower, it will be fed instead by the pipe 58 back into the column 53. The measuring receptacle 84 has attached to the inlet pipe 81 therein a container 86 which discharges the liquid laterally near the inner periphery of the receptacle 84, and around the inlet pipe 81 there is located an outlet pipe 87 having a slot 88 with a scale 89 at the side thereof to indicate by the height of the level of the liquid in the receptacle 84 the speed of outflow of the liquid. The pipe 87 conveys this constant boiling mixture of ethyl acetate, alcohol, and water, to a mixing coil 90 which is supplied with water by means of a pipe 91 leading from a measuring receptacle 92 constructed in the same manner as the measuring receptacle 84, and which is continuously supplied with water by means of a valved pipe 93. From the mixing coil 90 these liquids pass into a separating chamber 94 where the liquid separates into a lower water layer 95 containing small percentages of ethyl acetate, and alcohol, and an upper layer 96 containing approximately 93% of ethyl acetate, 5% of water, and 2% of alcohol. The lower layer containing the small percentage of ethyl acetate passes out of the separating chamber 94 by a vented overflow pipe 97 to the pipe 59, and thence back to the column 53. The upper layer of liquid 96 containing a higher percentage of ester flows out of the chamber 94 by a trapped pipe 98 into the side of a drying column 99. This column 99 is constructed on the interior thereof in the same manner as the column 53. The lower portion of the column 99 is maintained at a temperature of substantially 75° C. The vapors passing out of the top of the column 99 are conveyed by a pipe 100 to a dephlegmator 101 having tube sheets 102 and 103 carrying a plurality of tubes 104, and arranged to return the liquid therefrom by a trapped pipe 105 to the upper end of the column 99 in order to seal the pans therein. Said dephlegmator 101 is cooled in the usual manner by means of a current of water supplied with the aid of inlet and outlet pipes 106 and 107. The uncondensed vapors pass out of the dephlegmator 101 by a pipe 108 to a condenser 109 having tube sheets 110 and 111 provided with tubes 112 and cooled by a current of water with the aid of inlet and outlet pipes 113 and 114. The condensate which will ordinarily comprise constant boiling mixtures of ethyl acetate, alcohol, and water, passes out of the condenser 109 by a pipe 115 to an overflow bottle 116 having a vent 117 and an outlet pipe 118. This outlet pipe 118 is connected by a valved pipe 119 to the pipe 105, so that when desired the liquid may be returned to the column 99 so as to avoid returning the liquid to the column 53 when the latter or some part associated therewith is to be thrown out of operation temporarily. Ordinarily, however, this pipe 119 will be closed and the liquid will be fed from the pipe 118 to the pipe 58, and thence either into the measuring receptacle 84 or the column 53 according to the composition of the liquid as above pointed out. From the bottom of the column 99 ethyl acetate having a strength of 95 to 100% passes out by a pipe 120, to an overflow bottle 121 having a vapor outlet pipe 122 leading back to the column 99 and an outlet pipe 123 leading out of the bottom of the bottle 121. This pipe 123 conveys the ethyl acetate to a cooling coil 124 located in a cooler 125 cooled by a current of water supplied with the aid of inlet and outlet pipes 126 and 127. The cooled ethyl acetate passes away from the cooler 125 by means of a trapped pipe 128, and is collected in a storage receptacle 129 from which it may be drawn off from time to time, as desired, by a valved pipe 130.

The operation of my invention will be apparent from the above description. It will be understood, however, in general that to provide an excess of alcohol the tank 10 is in starting filled with alcohol, then the sulphuric acid, alcohol, and vinegar are mixed in the proper proportions hereinabove referred to in the two tanks 1 and 2 alternately, and that from these tanks the mixed materials are conveyed continuously to the supply tank 10 from which they are continuously conveyed through the preheater 13 to the esterification column 20, from the bottom of which the slop containing sulphuric acid is continuously discharged, while the vapors of ethyl acetate, alcohol, and water pass out of the top of the same to the preheater 13 which acts also as the dephlegmator, to return to the column 20 the first condensate. From the dephlegmator 13 the vapors pass into the hot condenser 31 and finally the cold condenser 41, so as to condense the vapors to a liquid with the minimum loss of heat, and thus obtain a mixture of ethyl acetate, alcohol and water in the form of a liquid prior to supplying the same to the separating column 53. It is highly desirable to condense these vapors to a liquid at this point, as, otherwise, owing to the low latent heat of vaporization of the ethyl acetate present compared with the high latent heat of vaporization of the alcohol present, if these materials were fed into the column 53 in uncondensed form, the ethyl acetate in the column 53 would be vaporized to a disadvantageous degree because of the large amount of heat present. In the column 53 the ester is separated from the alcohol, the alcohol being fed back into the esterification column while the ester and admixed remaining alcohol and water are obtained in the form of a constant boiling mixture which is thereafter intermingled with water in the coil 90, so as to form the two layers of liquid containing high and low percentages of ethyl acetate respectively in the chamber 94. The layer containing the lower percentage of ethyl acetate is fed back into the separating column 53 while the layer containing the higher percentage of ethyl acetate is conveyed into the drying or rectifying column 99 where the excess of the ester over the constant boiling mixture of ethyl acetate, alcohol, and water is drawn off as a residue at the bottom, passed through the cooler 125, and received in the storage receptacle 129, the constant boiling mixture being returned from the top of the column 99 either to the measuring receptacle 84 or the column 53. In this way, it is possible to obtain continuously ethyl acetate having a strength of 95 to 100% according to the operation of the apparatus.

It will be understood that other acids and other alcohols may be used instead of the acetic acid or vinegar and the ethyl alcohol, as for example butyric acid and methyl alcohol and that instead of the sulphuric acid another catalyst may be used, as for example hydrochloric acid or some other organic acid, such as formic acid.

While I have described my invention above in detail, I wish it to be understood that many changes may be made therein without departing from the spirit thereof.

I claim:

1. The process which comprises bringing a mixture containing an ester, water, and an alcohol into contact with a body of water, and thereby forming two layers of liquid containing respectively high and low percentages of the ester.

2. The process which comprises bringing a mixture containing ethyl acetate, water, and alcohol into contact with a body of water, and thereby forming two layers of liquid containing respectively high and low percentages of the ethyl acetate.

3. The process which comprises bringing a constant boiling mixture containing an ester, water, and an alcohol into contact with a body of water, and thereby forming two layers of liquid containing respectively high and low percentages of the ester.

4. The process which comprises bringing a constant boiling mixture containing ethyl acetate, water, and alcohol into contact with a body of water, and thereby forming two layers of liquid containing respectively high and low percentages of the ethyl acetate.

5. The process which comprises continuously forming an ester by feeding an alcohol, an organic acid, and a catalyst, so as to intermingle the same, heating the materials so intermingled by the injection of live steam, and continually removing the vapor of the ester formed.

6. The process which comprises continuously forming ethyl acetate by feeding alcohol, acetic acid, and a catalyst, so as to intermingle the same, heating the materials so intermingled by the injection of live steam, and continually removing the vapor of the ethyl acetate formed.

7. The process which comprises forming an ester by feeding an alcohol, an organic acid, and a catalyst to intermingle the same, evolving vapors therefrom, condensing the vapors evolved, and rectifying the condensate so as to separate out from the condensate a large percentage of the alcohol.

8. The process which comprises forming ethyl acetate by feeding alcohol, acetic acid, and a catalyst to intermingle the same, condensing the vapors evolved, and rectifying the condensate so as to separate out from the condensate a large percentage of the alcohol.

9. The process which comprises forming an ester by feeding an alcohol, an organic acid, and a catalyst to intermingle the same, removing therefrom a mixture containing the ester formed, and rectifying the mixture so as to obtain a constant boiling mixture of the ester, the alcohol, and water.

10. The process which comprises forming ethyl acetate by feeding alcohol, acetic acid, and a catalyst to intermingle the same, removing therefrom a mixture containing the ethyl acetate formed, and rectifying the mixture so as to obtain a constant boiling mixture of ethyl acetate, alcohol, and water.

11. The process which comprises forming an ester by feeding an alcohol, an organic acid, and a catalyst to intermingle the same, removing therefrom a mixture containing the ester formed, rectifying the mixture so as to obtain a constant boiling mixture of the ester, the alcohol, and water, and mixing the constant boiling mixture with a body of water so as to form two liquid layers containing high and low percentages of the ester formed respectively.

12. The process which comprises forming ethyl acetate by feeding alcohol, acetic acid, and a catalyst to intermingle the same, removing therefrom a mixture containing the ethyl acetate formed, rectifying the mixture so as to obtain a constant boiling mixture of ethyl acetate, alcohol, and water, and mixing the constant boiling mixture with a body of water so as to form two liquid layers containing high and low percentages of the ethyl acetate formed respectively.

13. The process which comprises forming an ester by feeding an alcohol, an organic acid, and a catalyst to intermingle the same, removing therefrom a mixture containing the ester formed, rectifying the mixture so as to obtain a constant boiling mixture of the ester, the alcohol, and water, mixing the constant boiling mixture with a body of water so as to form two liquid layers containing high and low percentages of the ester formed respectively, and rectifying the liquid layer containing a higher percentage of the ester, so as to obtain as a residue the ester substantially free from water.

14. The process which comprises forming ethyl acetate by feeding alcohol, acetic acid, and a catalyst to intermingle the same, removing therefrom a mixture containing the ethyl acetate formed, rectifying the mixture so as to obtain a constant boiling mixture of ethyl acetate, alcohol, and water, mixing the constant boiling mixture with a body of water so as to form two liquid layers containing high and low percentages of the ethyl acetate formed respectively, and rectifying the liquid layer containing a higher percentage of the ethyl acetate, so as to obtain as a residue the ethyl acetate substantially free from water.

15. The process which comprises forming an ester by feeding an alcohol, an organic acid, and a catalyst to intermingle the same, removing therefrom a mixture containing the ester formed, rectifying the mixture so as to obtain a constant boiling mixture of the ester, the alcohol, and water, mixing the constant boiling mixture with a body of water so as to form two liquid layers containing high and low percentages of the ester formed respectively, and rectifying the liquid layer containing a higher percentage of the ester, so as to obtain as a residue the ester substantially free from water, while returning the liquid layer containing the lower percentage of ester to be rectified in the rectification which produces the constant boiling mixture.

16. The process which comprises forming ethyl acetate by feeding alcohol, acetic acid, and a catalyst to intermingle the same, removing therefrom a mixture containing the ethyl acetate formed, rectifying the mixture so as to obtain a constant boiling mixture of ethyl acetate, alcohol, and water, mixing the constant boiling mixture with a body of water so as to form two liquid layers containing high and low percentages of the ethyl acetate formed respectively, and rectifying the liquid layer containing a higher percentage of the ethyl acetate, so as to obtain as a residue the ethyl acetate substantially free from water, while returning the liquid layer containing the lower percentage of ethyl acetate to be rectified in the rectification which produces the constant boiling mixture.

17. The process which comprises forming an ester by feeding an alcohol, an organic acid, and a catalyst to intermingle the same, removing therefrom a mixture containing the ester formed, rectifying the mixture so as to obtain a constant boiling mixture of the ester, the alcohol, and water, mixing the constant boiling mixture with a body of water so as to form two liquid layers containing high and low percentages of the ester formed respectively, and rectifying the liquid layer containing a higher percentage of the ester, so as to obtain as a residue the ester substantially free from water, while returning the liquid layer containing the lower percentage of ester to be rectified in the rectification which produces the constant boiling mixture, and while returning the constant boiling mixture from the rectification of the liquid layer containing the high percentage of ester also to the rectification where the first mentioned constant boiling mixture is produced.

18. The process which comprises forming ethyl acetate by feeding alcohol, acetic acid, and a catalyst to intermingle the same, removing therefrom a mixture containing the ethyl acetate formed, rectifying the mixture so as to obtain a constant boiling mixture of ethyl acetate, alcohol, and water, mixing the constant boiling mixture with a body of water so as to form two liquid layers containing high and low percentages of the ethyl acetate formed respectively, and rectifying the liquid layer containing a higher percentage of the ethyl acetate, so as to obtain as a residue the ethyl acetate substantially free from water, while returning the liquid layer containing the lower percentage of ethyl acetate to be rectified in the rectification which produces the constant boiling mixture, and while returning the constant boiling mixture from the rectification of the liquid layer containing the high percentage of ethyl acetate also to the rectification where the first mentioned constant boiling mixture is produced.

19. The process which comprises forming an ester by feeding an alcohol, an organic acid, and a catalyst to intermingle the same, removing therefrom a mixture containing the ester formed, and rectifying the mixture so as to obtain a constant boiling mixture of the ester the alcohol and water while returning the separated alcohol so as to intermingle the same with the ester forming materials.

20. The process which comprises forming ethyl acetate by feeding alcohol, acetic acid, and a catalyst to intermingle the same, removing therefrom a mixture containing the ethyl acetate formed, and rectifying the ethyl acetate so as to obtain a constant boiling mixture of ethyl acetate, alcohol and water, while returning the separated alcohol so as to intermingle the same with the ethyl acetate forming materials.

21. The process of preparing esters which consists in admitting the previously admixed and preheated reacting materials together with a catalyst into the side of the top of a column provided with pans while admitting steam at a lower point to secure an evolution of ester-containing vapors, cooling, condensing and partially separating the said vapors, mixing water with the more volatile condensate thereby obtained to produce a separation and stratification, withdrawing the upper stratum relatively rich in desired ester, and rectifying this stratum to obtain a residue still richer in the desired ester.

22. In a process of making esters, the steps comprising mixing water with an ester containing alcoholic liquor, allowing the layers of ester and aqueous liquid to separate, and distilling the ester to separate it from a constant boiling mixture of ester, alcohol and water.

23. In a process of making esters, the steps comprising mixing water with an ester containing alcoholic liquor, allowing the layers of ester and aqueous liquid to separate, distilling the ester to separate it from a constant boiling mixture of ester, alcohol and water, and returning the alcoholic liquor for further production of ester.

24. In a process of manufacturing ethyl acetate, the steps comprising mixing an alcoholic liquor containing considerable amounts of ethyl acetate with water and allowing the layers to separate, and distilling the acetate layer in a plate column to remove from the top thereof a constant boiling mixture of ethyl acetate, alcohol and water and from the bottom thereof a concentrated ethyl acetate.

25. In a process of manufacturing ethyl acetate, the steps comprising mixing an alcoholic liquor containing considerable amounts of ethyl acetate with water and allowing the layers to separate, distilling the acetate layer in a plate column to remove from the top thereof a constant boiling mixture of ethyl acetate, alcohol and water and from the bottom thereof a concentrated ethyl acetate, and returning the alcoholic liquor to the process for the formation of ethyl acetate.

26. The process of manufacturing ethyl acetate comprising the steps of distilling a mixture of ethyl acetate, alcohol and water in a plate column heated to maintain its top near 70° C., mixing the evolved distillate with water and allowing the mixture to separate, and distilling the ester layer to obtain a constant boiling mixture of gases and a concentrated ethyl acetate.

27. The process of manufacturing ethyl acetate comprising the steps of forming ethyl acetate from acetic acid and alcohol in a column heated to maintain its top at about 80° C., conducting the evolved distillate into a separating column heated to maintain its top near 70° C., returning alcoholic liquor from its bottom to the former column, mixing the evolved distillate with water and allowing separation to take place, distilling the ester layer to form a constant boiling mixture and a concentrated ethyl acetate, and returning the constant boiling mixture to the process for further isolation of ethyl acetate.

28. The process of manufacturing ethyl acetate comprising the steps of forming ethyl acetate from acetic acid and alcohol in a column which is heated to maintain the top at about 80° C., conducting the evolved distillate into a separating column heated to maintain its top near 70° C., returning alcoholic liquor from its bottom to the former column, mixing the evolved distillate with water and allowing separation to take place, and distilling the ester layer to form a constant boiling mixture and a concentrated ethyl acetate.

29. The process of manufacturing ethyl acetate comprising the steps of forming ethyl acetate from acetic acid and alcohol in a column which is heated to maintain its top near 80° C., conducting the evolved distillate into a separating column heated to maintain its top near 70° C., mixing the evolved distillate with water and allowing separation to take place, and distilling the ester layer to form a constant boiling mixture and a concentrated ethyl acetate.

30. In a process of manufacturing ethyl acetate, the steps comprising forming ethyl acetate from acetic acid and alcohol in a column heated to maintain its top near 80° C., conducting part of the evolved distillate into a separating column heated to maintain its top near 70° C., and returning the alcoholic liquor from its bottom to the former column.

31. In a process of manufacturing ethyl acetate, the steps comprising forming ethyl acetate from acetic acid and alcohol in a column heated to maintain its top near 80° C., conducting part of the evolved distillate into a separating column heated to maintain its top near 70° C. whereby a substantially constant boiling mixture is obtained, treating the latter with water and separating the ester, and distilling the latter to produce a constant boiling mixture and a concentrated ethyl acetate.

In testimony that I claim the foregoing, I have hereunto set my hand this 21 day of August, 1919.

ARTHUR A. BACKHAUS.